UNITED STATES PATENT OFFICE.

ROBERT PUNSHON, OF NEWCASTLE-UPON-TYNE, ENGLAND.

IMPROVEMENT IN EXPLOSIVE COMPOUNDS FROM GUN-COTTON.

Specification forming part of Letters Patent No. 124,510, dated March 12, 1872.

SPECIFICATION.

I, ROBERT PUNSHON, of Newcastle-upon-Tyne, in the county of Northumberland, England, have invented certain Improvements in the Manufacture of Gun-Cotton; of which the following is a specification:

My invention has for its object the preparation of gun-cotton, in such a manner as to regulate the rapidity of its explosiveness, and thereby render it more suitable for use in guns for military and sporting purposes. And my invention consists in coating, covering, or incorporating the particles or fibers of gun-cotton with sugar, either raw or refined, in such a manner as to separate or isolate the said particles or fibers. In preparing gun-cotton, in order to adapt it for use in guns, by reducing its tendency to instantaneous explosion, I thoroughly incorporate with it sugar in the proportion of thirty-three per cent. (or thereabout) by weight of the gun-cotton, so that one hundred grains of gun-cotton, when so treated, will weigh one hundred and thirty grains or thereabouts. The said proportion of thirty-three per cent. (or thereabout) of sugar, has been found to regulate the explosiveness of the prepared gun-cotton in a suitable degree, and to develop the required force while burning in the gun-barrel, also to drive out the projectile therefrom with the requisite initial velocity. It is essential that the gun-cotton should be fully impregnated and incorporated with the sugar, in order to cause the required separation or isolation of the particles of gun-cotton by particles of sugar; and in order to do this effectually it is preferable that the gun-cotton should be first cut and divided into small particles; then the proper quantity of sugar, being prepared by having put to it sufficient boiling water just to dissolve it and no more, is kneaded or worked into the gun-cotton in this divided state—either by hand or by mechanical means—until the gun-cotton and the sugar, in the proportions stated above, are thoroughly incorporated. This process of kneading and incorporation should be so carefully worked out as to prevent, as far as possible, any particles of the gun-cotton from getting together without being separated or isolated by particles of sugar. The requisite drying of the prepared gun-cotton, after its incorporation with the sugar, in the manner described, is, or may be effected by means of a drying-plate or other suitable means, and at a temperature of about from one hundred and fifty to two hundred degrees Fahrenheit. The prepared gun-cotton, after being dried, is cut or divided into grains or disks of a size adapted for the different calibers of guns, in which it is required to be used, and it is important that the grains or disks should be uniform in size in order to secure uniformity of trajectory in firing.

Having thus described the nature of the said invention, and the means by which the same is to be carried into effect, I hereby declare that I do not claim as my invention the use of sugar in the preparation of gun-cotton otherwise than as hereinafter stated; but—

What I do claim as of my invention is—

The treatment and preparation of gun-cotton with sugar in the proportion and in the manner hereinbefore stated and described, in order to adapt it for use in guns.

In witness whereof, I, the said ROBERT PUNSHON, have hereunto set my hand and seal the 2d day of December, 1871.

ROBERT PUNSHON.

Witnesses:
WILLIAM SPENCE,
W. A. JACKSON.